A. J. MOTTLAU.
AUTOMATIC CAMERA.
APPLICATION FILED APR. 28, 1916.

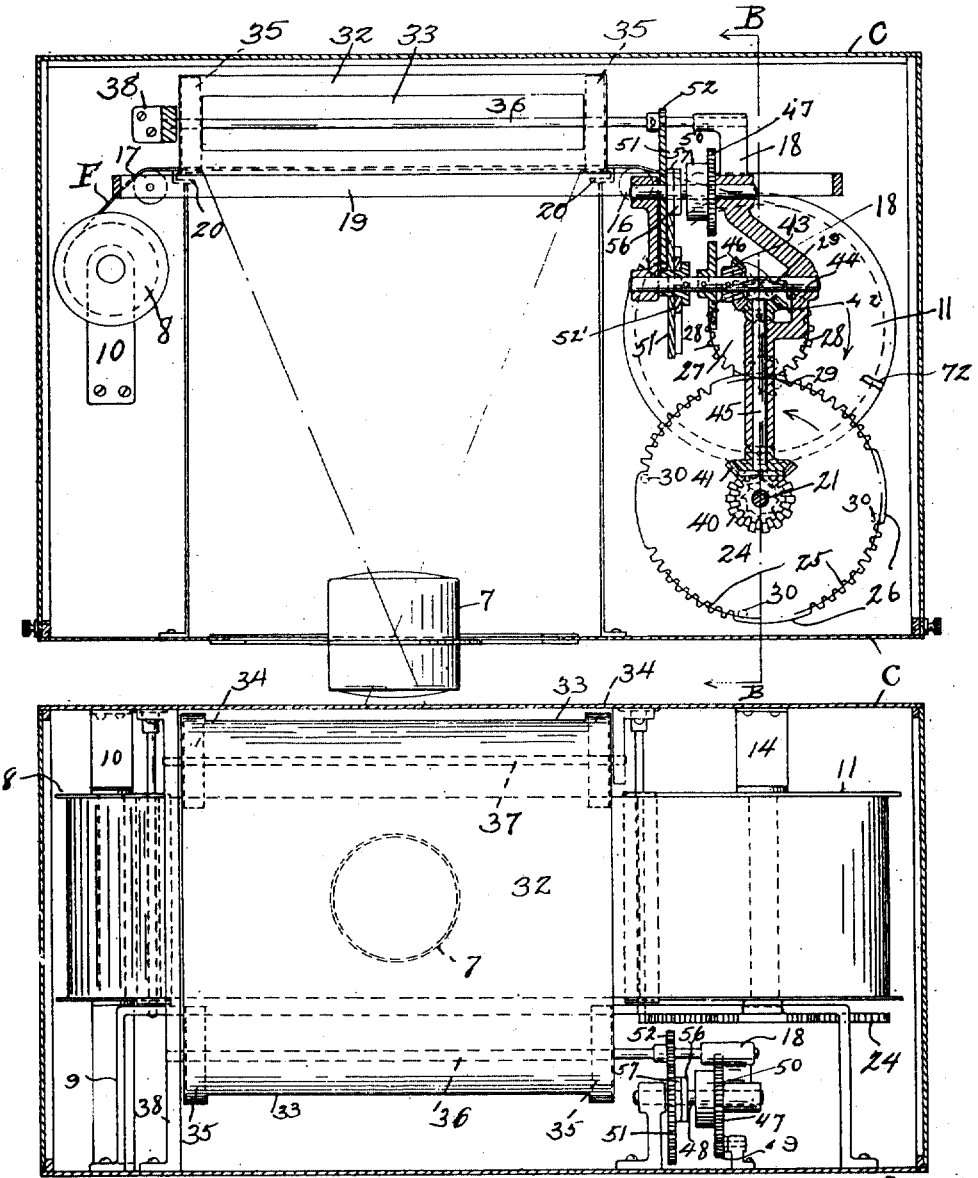

1,235,997.

Patented Aug. 7, 1917.
2 SHEETS—SHEET 2.

Inventor
A. J. Mottlau
By John O. Seifert
his Attorney

UNITED STATES PATENT OFFICE.

AUGUST J. MOTTLAU, OF PHILADELPHIA, PENNSYLVANIA, ASSIGNOR, BY DIRECT AND MESNE ASSIGNMENTS, TO G. E. M. ENGINEERING COMPANY, OF PHILADELPHIA, PENNSYLVANIA, A CORPORATION OF DELAWARE.

AUTOMATIC CAMERA.

1,235,997.     Specification of Letters Patent.     Patented Aug. 7, 1917.

Application filed April 28, 1916. Serial No. 94,280.

*To all whom it may concern:*

Be it known that I, AUGUST J. MOTTLAU, a subject of the King of Denmark, residing in Philadelphia, in the county of Philadelphia and State of Pennsylvania, have invented a new and useful Improvement in Automatic Cameras, of which the following is a specification.

This invention relates to cameras and particularly to automatically operated cameras, and it is the object of the invention to provide a camera to take pictures of successive portions of an object or landscape by the camera from a moving vehicle or carrier for the camera, such, for instance, as an aeroplane, and to provide a camera which is simple and cheap in construction and efficient in operation.

With this object in view, I provide a casing in which the mechanism is inclosed having an aperture or opening for a lens, with a support for a roll of web film and a take-up roll for said film intermittently rotated by a continuously rotated spring-actuated shaft to intermittently feed the film across the lens, and provide an apertured curtain intermittently moved across the film by means operable from the continuously rotating shaft, the movement of the curtain being so timed with relation to the movement of the film that it will intercept the light rays through the lens during the periods of movement of the film and expose a portion of the film through an aperture in the curtain during the periods of rest of the film.

In the drawings accompanying and forming a part of this specification Figure 1 is a sectional side elevation of a camera showing an embodiment of my invention, the section being taken on the line A—A of Fig. 3 looking in the direction of the arrows.

Fig. 2 is a plan view with the top of the casing removed to show the interior mechanism.

Similar characters of reference designate like parts throughout the different views of the drawings.

Figure 3:
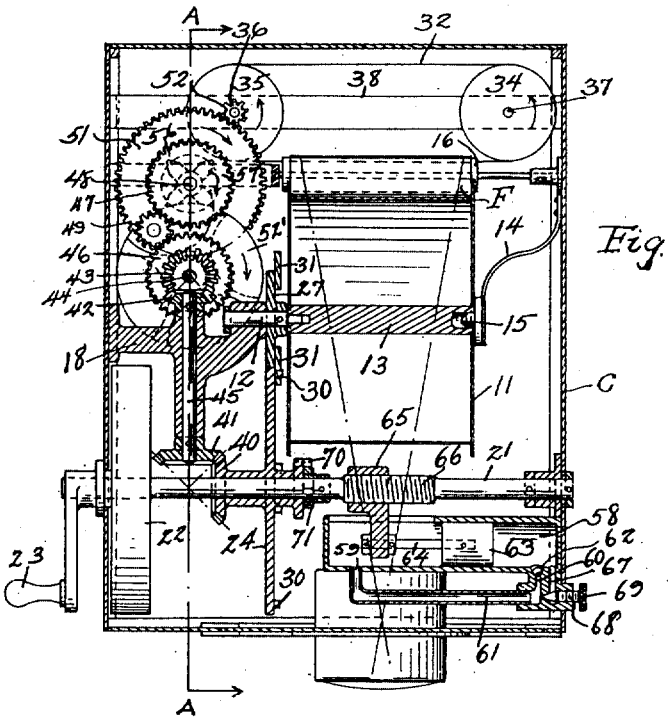
Fig. 3 is a cross sectional view taken on the line B—B of Fig. 1 looking in the direction of the arrows.

The embodiment of the invention as shown in the drawings consists of a casing C to inclose and carry the mechanism, said casing having a removable part as usual, whereby the access may be had to the mechanism or for the purpose of supplying or removing a film, and has in one wall an opening for the mounting of a lens 7. A spool 8 for a roll of web film F is rotatably supported at one end in a bracket 9 and the other end supported by a bracket or arm 10, this latter arm being constructed of resilient or spring material, so that it may be sprung to permit of the insertion of the spool trunnions in the bearings in said brackets. The film is adapted to pass across the lens and is connected at the free end to a take-up roll 11 in the casing adjacent the side opposite to the spool of rolled film, and supported at one end upon a stud 12 rotatably mounted in a bracket 18, the said stud engaging in a recess in the core 13 of the take-up roll, and said roll is supported at the opposite end by the free end of a resilient or spring arm 14 the said arm being fixed at one end to the casing and carrying at its free end a pin or stud 15 to engage in a recess in the opposite end of the roll core. By this construction the arm will give laterally to permit of the removal or insertion of the roll, and the tension of the arm is such as to exert a pressure on the roll and thereby maintain it upon its support. The film in its travel to the take-up roll is guided over a pair of rollers 16, 17 rotatably supported in a bracket 18 and over a pair of guide bars 20, the said guide bars being substantially of channel shape in cross section for a purpose to be hereinafter described.

The film is intermittently fed across the lens from a rotatable shaft 21 continuously driven by a spring 22, one end of which spring is connected to the shaft and the other end to a fixed part as usual, the said spring being wound by a crank 23 fixed to the shaft exterior of the casing. To intermittently rotate the take-up roll from the shaft there is fixed on the shaft a mutilated gear 24, the said gear having four segmental toothed portions 25 with a blank space 26 between said toothed portions. The gear coöperates with a mutilated pinion 27, said pinion having opposed toothed sections 28 with diametrically opposite blank sections 29 between the toothed sections. The gear 24 is rotated in the direction of the arrow (Fig. 1) by the spring and during each one-fourth revolution of the gear, or as a toothed segment thereof is in mesh with a toothed portion of the pinion, the pinion will have a one-half revolution imparted thereto. As the blank portion 26 of the gear comes opposite the pinion no motion will be imparted to the pinion; but just previous to the next toothed section of the gear coming in contact with the pinion one of a series of four pins 30 projecting laterally from one face of the gear will engage with one of a pair of dogs 31 fixed to and projecting beyond the periphery of the pinion thereby moving the pinion so that a toothed section thereof will mesh with a toothed portion of the gear when a further one-half revolution will be imparted to the pinion and such movement transmitted through the shaft 12 to the take-up roll 11.

It will be noted that the diameter of the take-up roll is relatively large as compared with the film carrying spool 8. By making this roll large the necessity of providing a differential drive is obviated since it is contemplated to produce a picture approximately four inches in length and a length of film to provide thirty-six pictures to such length, and as the film is taken up by the roll 11 the diameter will not be appreciably increased. The normal space between successive pictures is one-eighth inch and while this space is somewhat increased as the end of the film is approached, it has been calculated and in practice it has been found that the space between the last two adjacent pictures is increased to but one-half inch which in no way will interfere with the picture which has been taken.

To intercept the light rays through the lens during the movement of the film and to expose a portion of the film during the periods of rest shutter mechanism is provided, consisting of an endless apertured curtain 32, the curtain in the present instance having two apertures 33, and supported adjacent its lateral ends upon rollers 34, 34 and 35, 35 fixed to shafts 36, 37 journaled at one end in a bracket 38 and at the opposite end in an extension of the bracket 18. The curtain is movable intermittently transversely of the film and during this movement is guided in the channel portion of the bars 12, as clearly shown in Fig. 1, these channel bars also serving to separate the curtain from the film.

This intermittent movement is imparted to the curtain by the shaft 21 through a beveled pinion 40 rotatable with said shaft, and which may be constructed integral with the gear 24, meshing with a beveled pinion 41 fixed to a vertical shaft 45 journaled in the bracket 18 and having at the end opposite to the pinion 41 a beveled pinion 42 meshing with a beveled pinion 43 fixed to a shaft 44. Fixed to the shaft 44 is a pinion 46 driving a second pinion 47 loose on a shaft 48 in the same direction as the first pinion 46 through an intermediate pinion 49.

Figures 4, 5, 6:
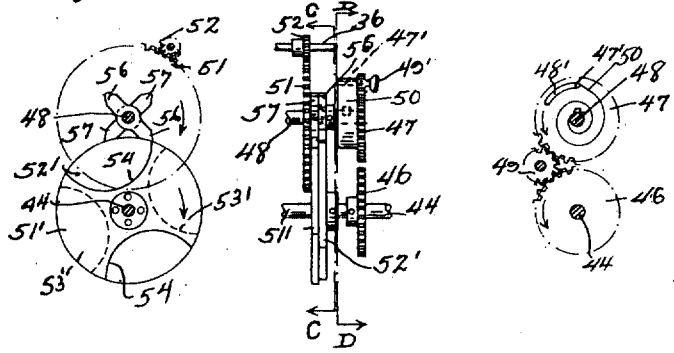
Fig. 4 is a detail view of the means to control the movement of the curtain, said view being taken on the line and looking in the direction of the arrows C—C of Fig. 5.
Fig. 5 is a detail view of the means to intermittently move the curtain.
Fig. 6 is a detail side elevation taken on the line and looking in the direction of the arrows D—D of Fig. 5.

Motion is imparted from the pinion 47 intermittently to the shaft 48 through a spring 50 coiled about the shaft and connected to one end of the shaft and at the other end to a pin 47' projecting laterally from the pinion, and such movement of the shaft 48 is transmitted to the curtain through a gear 51 fixed to the shaft 48 meshing with a pinion 52 fixed to the shaft 36 of the curtain carrying wheels 35. The pinion 47 is rotated in the direction indicated by the arrows in Figs. 3 and 6, and as said pinion is rotated it will wind the spring 50 around the shaft and the tension of the spring will rotate the connected shaft and the gear 51 fixed thereon in the same direction as the pinion 47 as indicated by the arrows in Figs. 3 and 4 and the curtain carrying wheels 34, 35 in the direction of the arrows through the pinion 52. The shaft 48 is held against movement and is successively released to permit movement to be imparted thereto through the pinion 47 to the spring 50 by escapement mechanism consisting of a pair of juxtaposed disks 51', 52' fixed to the shaft 44, the disk 51' having diametrically opposite circular recessed portions 53, 53 and the disk 52' having similar recesses 54, 54, said latter recesses being located at right angles to the recesses 53, in the disk 51', as clearly shown in Fig. 4. Fixed to the shaft in juxtaposed relation to each other and the gear 51 are dogs 56 and 57 extending laterally from the shaft diametrically opposite to each other and the dogs 56 being substantially at right angles to the dogs 57. The disks 51' and 52' are rotated in the direction of the arrow (Fig. 4) with the pinion 46, and the dogs 56, 57 and gear 51 are urged in the direction of the arrow by the spring 50. However, rotation of the gear 51 is prevented by a dog 56 engaging with an unrecessed portion of the periphery of the disk 52' until said dog reaches a recess in the disk when the spring 50 will urge said disk and the connected gear in the direction of the arrow and thereby impart movement to the curtain and until a dog 57 engages with an unrecessed portion of the disk 51'. During such engagement of a dog 57 with the disk 51' the spring 50 will again be wound or tensioned until a recessed portion of the disk 51' reaches said dog 57 when the dog with the connected gear 51 will again be advanced by the spring 50. The mechanism is so timed that when the film is being moved the curtain or shutter remains stationary intercepting the light rays through the lens to the film, the apertured portions of the curtain during this time being at opposite ends, and when the film is stationary the curtain will be moved to expose the film through an aperture 33 in the curtain. To increase or decrease the tension of the spring 50 the pin 57' is adjustably connected to the pinion 47, for which purpose the pin 47' to which one end of the spring is connected has a screw threaded shouldered end to engage in a slot 48' in the pinion 47 and clamped in adjusted position in said slot by a thumb-nut 49'.

The movement of the mechanism is regulated through the shaft 21, and for this purpose there is provided a dash-pot consisting of a cylinder 58 for a suitable fluid or liquid, the bore of the cylinder extending parallel with the shaft 21. The cylinder has ports 59, 60 adjacent opposite ends connected by a tube 61 and the port 60 closed by a valve 62 closing outward from and opening into the cylinder to normally shut off communication between opposite ends of the cylinder through the ports 59, 60. A plunger or piston 63 is adapted to reciprocate in the cylinder, said piston being connected by a rod 64 to an arm 65 extending through a slot in the cylinder and said arm having screw threaded connection with the shaft 21, as shown at 66. The end of the cylinder in front of the piston is also connected to the opposite end through the tube 61 and port 59 through an outlet or port 65 connected to the tube 61, the opening and closing as well as the area of the port being controlled by a needle valve 68 operable by a knurled finger piece 69 exterior of the casing. As the operating spring 22 is wound the arm 65 with the piston 63 will be moved to the left as viewed from Fig. 3, this movement of the piston unseating the valve 62 and drawing the liquid from in back to the front of the piston. During the winding of the spring no movement will be imparted to the film feeding and shutter actuating mechanism as said mechanism will be uncoupled from the shaft 21 by a pawl 70 carried by the gear 24 riding over a ratchet-wheel 71. After the spring 22 has been wound and the mechanism is being actuated by the spring the shutter actuating and film feeding mechanism will be connected to the shaft through the pawl and ratchet 70, 71 and the movement of the shaft will cause the piston 63 to move into the cylinder, this movement of the piston seating the valve 62 and permitting the escape of the fluid in front of the piston only through the restricted outlet 67 thereby retarding the movement of the piston and thereby the rotation of the shaft 21 as well as the connected shutter actuating and film feeding mechanism. It will be obvious that this movement is regulated in accordance with the restricting or enlarging of the outlet 67 by the needle valve 68. The operation of the camera may be stopped at will by screwing the valve 68 to its seat to prevent the escape of fluid from in front of the piston. It will be noted that the arm 65 instead of passing through a slot in the cylinder to connect it to the piston 63, may be so connected to the piston whereby the cylinder will be entirely closed, but for the purpose for which the present camera is designed, that is, for taking pictures of a landscape from an aeroplane, the construction as illustrated will suffice, since in such use the portion of the camera in which the lens is located will be at the bottom.

As is well known to develop a web film special apparatus is required to simultaneously or successively develop all portions of the film, and it has been found preferable to develop successive pictures separately since this can be done by the use of a number of small trays. By the provision of the take-up roll of large diameter, while the space between the successive pictures will be gradually increased as the diameter of the roll increases due to the winding of the film thereon, that portion of the film constituting the forward end of successive pictures will always come at a certain point on the roll radially outward from the center, and for this purpose the roll is provided with one or more notches 72, shown in the present instance as two in number, which indicate the front edge or end of the successive pictures on the film and by the provision of these notches the film may be scratched or otherwise marked to indicate where the film may be severed without cutting through a picture. Furthermore, the gradual increasing spaces between successive pictures may be utilized to indicate successive pictures which have been taken and greatly facilitate the sorting of photographs printed from the film and the mounting of said pictures in proper sequence.

Having thus described my invention I claim:

1. In a camera, the combination of a support for a rolled web film; a take-up roll for said film; a continuously rotating shaft; means to intermittently rotate the take-up roll from said shaft to feed the film; and an endless apertured curtain, the film during the periods of movement passing transversely across and in back of the curtain between the apertures, and an aperture of the curtain passing across and exposing successive portions of the film during the periods of rest of the latter.

2. In a camera, the combination of a support for a rolled web film; a take-up roll for said film; a continuously rotating shaft; means to intermittently rotate the take-up roll from said shaft to feed the film; a shutter to intercept said film during the periods of motion of the film and operable to expose portions of the film during the periods of rest of the film; a liquid carrying chamber having connected ports adjacent the opposite ends; and a plunger operatively connected to the shaft to have longitudinal movement imparted thereto by the movements of the shaft to regulate the movement of the shaft.

3. In a camera, the combination of a support for a rolled web film; a take-up roll for said film; a rotatable shaft; a spring to continuously rotate said shaft; means to intermittently rotate the take-up roll from said shaft to feed the film; a shutter to intercept said film during the periods of movement and operable from the shaft to expose portions of the film during the periods of rest of the film; a liquid receptacle having a restricted outlet; and a plunger movable by the rotary movement of the shaft during the feeding of the film and actuation of the shutter by the said shaft to regulate the movement of the shaft.

4. In a camera, the combination of a lens; a roll of web film; a take-up roll for said film; a continuously rotated shaft; means actuated from the shaft to intermittently rotate the take-up roll to feed the film across the lens; an endless apertured curtain movable across the film; wheels to support said curtain; and means operable from the shaft to rotate said wheels alternately with the movement of the film and move the curtain, said movement of the curtain being so timed that no movement will be imparted to the curtain during the movement of the film with a portion of the curtain between the apertures intersecting the light rays through the lens to a portion of the film and movement imparted thereto to successively expose a portion of the film through an aperture during the periods of rest of the film, said exposed portion of the film constituting at least one lap around the core of the take-up roll.

5. In a camera, the combination of a lens; a roll of web film; a take-up roll for said film; a continuously rotated shaft; means actuated from the shaft to intermittently rotate the take-up roll to feed the film across the lens; an endless apertured curtain movable across the film; rotatable means to support said curtain; means operable from the shaft to intermittently rotate said means alternately with the movement of the film and move the curtain, said movement of the curtain being so timed that no movement will be imparted to the curtain during the movement of the film with a portion of the curtain between the apertures intercepting the light rays through the lens to a portion of the film and movement imparted thereto to successively expose a portion of the film through an aperture during the periods of rest of the film, said exposed portion of the film constituting at least one lap around the core of the take up roll, and means operable from and coöperating with the shaft to regulate the movement of the shaft, substantially as and for the purpose specified.

6. In a camera, the combination of a lens; a roll of web film; a take-up roll for said film; a continuously rotated shaft; means actuated from the shaft to intermittently rotate the take-up roll to feed the film across the lens; an endless apertured curtain movable transversely across the film; wheels to support said curtain; means operable from the shaft to intermittently rotate said wheels alternately with the movement of the film and move the curtain, said movement of the curtain being so timed that no movement will be imparted to the curtain during the movement of the film with a portion of the curtain between the apertures intercepting the light rays through the lens to a portion of the film and movement imparted thereto to successively expose a portion of the film through an aperture during the periods of rest of the film, said exposed portion of the film constituting at least one lap around the core of the take up roll; a liquid chamber having a restricted outlet; and a plunger movable in said chamber operable from the shaft during the movement thereof to regulate the movement of the shaft, substantially as and for the purpose specified.

7. In a camera, the combination of a lens; a roll of web film; a take-up roll for said film; a continuously rotated shaft; means actuated from the shaft to intermittently rotate the take-up roll to feed the film across the lens; an endless apertured curtain movable transversely across the film; wheels to support said curtain; means operable from the shaft to rotate said wheels alternately with the movement of the film and move the curtain, said movement of the curtain being so timed that no movement will be imparted to the curtain during the movement of the film with a portion of the curtain between the apertures intercepting the light rays through the lens to a portion of the film and movement imparted thereto to successively expose a portion of the film during the periods of rest of the film, said exposed portion of the film constituting at least one lap around the core of the take up roll; a fluid chamber having connected ports adjacent opposite ends; a plunger movable in the fluid chamber; and a screw threaded connection between said plunger and shaft to impart movement to plunger by the movement of the shaft during the actuation of the film-feeding and shutter-operating means to regulate the movements thereof through the shaft.

8. In a camera, the combination of a lens; a rotatably supported roll of web film; a take-up roll for said film; a rotatable shaft; a spring to continuously rotate said shaft; a mutilated gear fixed to said shaft; a mutilated pinion connected to the take-up roll to coöperate with the gear on the shaft; means carried by the gear to coöperate with means connected to the pinion to cause a toothed portion of the pinion to mesh with a toothed portion of the gear to intermittently rotate the take-up roll and advance the film; and shutter mechanism operable from the shaft to intercept the light rays through the lens to a portion of the film during the movement of the film and expose a portion of the film during the periods of rest of the film.

9. In a camera, the combination of a lens; a rotatably supported roll of web film; a take-up roll for said film; a rotatable shaft; a spring to continuously rotate said shaft; a mutilated gear fixed to said shaft; a mutilated pinion connected to the take-up roll to coöperate with the gear on the shaft; means carried by the gear to coöperate with means connected to the pinion to cause a toothed portion of the pinion to mesh with a toothed portion of the gear to intermittently rotate the take-up roll and advance the film; shutter mechanism operable from the shaft to intercept the light rays through the lens to a portion of the film during the movement of the film and expose a portion of the film during the periods of rest of the film; and means connected to and operable from the shaft to regulate the movement of the shaft.

10. In a camera, the combination of a lens; a rotatably supported roll of web film; a take-up roll for said film, said roll having means to indicate the forward edge of the successive pictures on the film; means to intermittently rotate the take-up roll to feed the film; and shutter mechanism to intercept the light rays through the lens to the film during the movement of the film and expose the film during the periods of rest thereof.

11. In a camera, the combination of a lens; a rotatably supported roll of web film; a take-up roll for said film, said roll being of a diameter so that a lap of film around said roll with constitute one or more successive pictures and having means to indicate the forward edge of the successive pictures of the film as the film is rolled upon said roll; means to intermittently rotate said take-up roll a predetermined distance; and shutter mechanism to intercept the light rays through the lens to the film during the movement of the film and expose the film during the periods of rest thereof.

12. In a camera, the combination of a lens; a rotatably supported roll of web film; a take-up roll for said film, said roll being of a diameter so that a lap of film around said roll will constitute one or more pictures; notches in the end of said roll to indicate the forward edge of successive pictures; means to intermittently rotate said take-up roll a predetermined distance; and shutter mechanism to intercept the light rays through the lens to the film during the movement of the film and expose the film during the periods of rest of the film.

13. In a camera, the combination of a lens; a rotatably supported roll of web film; a take-up spool for said film, the core of said spool being of a diameter whereby one lap around the same will constitute at least one picture; means to intermittently rotate said take-up spool to feed the film across the lens; and a shutter to intercept the light rays through the lens during the movement of the film.

14. In a camera, the combination of a lens; a rotatably supported roll of web film; an intermittently rotated take-up spool for the film, the core of said spool being of a diameter so that one lap of film around said core constitutes at least one or more successively exposed portions of the film; and a shutter to intercept the light rays through the lens during the movement of the film.

AUGUST J. MOTTLAU.

Copies of this patent may be obtained for five cents each, by addressing the "Commissioner of Patents, Washington, D. C."